United States Patent [19]
Forsström

[11] Patent Number: 6,097,946
[45] Date of Patent: Aug. 1, 2000

[54] METHOD AND ARRANGEMENT FOR MOBILE TELEPHONY

[75] Inventor: Niclas Forsström, Helsinki, Finland

[73] Assignee: Telefonaktiebolaget LM Ericsson, Stockholm, Sweden

[21] Appl. No.: 09/149,593

[22] Filed: Sep. 8, 1998

[30] Foreign Application Priority Data

Sep. 12, 1997 [FI] Finland .................................... 973683
Sep. 19, 1997 [FI] Finland .................................... 973732

[51] Int. Cl.[7] ............................................. H04Q 7/20
[52] U.S. Cl. .......................... 455/423; 455/570; 455/550
[58] Field of Search ................................. 455/403, 422, 455/570, 550, 67.1, 67.3, 423; 370/433, 435, 522; 379/93.28; 714/223, 228

[56] References Cited

U.S. PATENT DOCUMENTS 5,809,018  9/1998  Lehmusto ................................ 455/512
5,835,486  11/1998  Davis et al. ............................ 370/276

FOREIGN PATENT DOCUMENTS 0 348 078  12/1989  European Pat. Off. ........... H04J 3/17
2 257 333  1/1993  United Kingdom ............. H04Q 7/04

OTHER PUBLICATIONS

WO 91/02436; Knight et al.; Cellular Radio System, Feb. 1991.
ETSI Specification 06.32, "Voice Activity Detection," Jul. 7, 1989, Version 3.0.0.
ETSI Specification 06.31, "Discontinous Transmission (DTX) for full-rate speech traffic channels," Mar. 1990, Version 3.1.0.
NMT DOC.900-1: Automatic Cellular Mobile Telephone System, Nordic NMT-900, System description, Jan. 1985.

*Primary Examiner*—Curtis A. Kuntz
*Assistant Examiner*—Melur Ramakrishnaiah
*Attorney, Agent, or Firm*—Nixon & Vanderhye

[57] ABSTRACT

The present invention relates to a method, arrangement and apparatus for splitting signalling and speech in a signal stream in a telephone system including analog mobile communications, wherein the signalling and the speech are transmitted on the same communications channel. The method comprises steps of arranging the signalling into frames included within the signal stream to be transmitted from a mobile station to a mobile telephone exchange, evaluating acoustic noise during the transmission, monitoring the signal stream by a modem of an exchange of the system so as to detect frames including signalling bit sequences, splitting the signal stream into a signalling part and speech part during the transmission of the signal stream on basis of said monitoring by the modem, and generating comfort noise into the cut areas of the signal stream on basis of said evaluation so as to fill in those areas of the speech part which are cut off from the signal stream during the splitting.

15 Claims, 3 Drawing Sheets

6,097,946

METHOD AND ARRANGEMENT FOR MOBILE TELEPHONY

FIELD OF THE INVENTION

The present invention relates to a method for a telephone transmission system including analog mobile communications, such as communications in a Nordic Mobile telephone system (NMT). The invention relates further to a telephone transmission arrangement including analog mobile communications, such NMT communications. In addition, the invention relates to an analog mobile exchange, such as to an exchange for NMT communications.

BACKGROUND OF THE INVENTION

In a mobile telephone system the communications between a mobile station (MS) and a mobile telephone exchange (MTX) is performed via routes known as channels. The signal traffic in the channels consist of signalling and the actual sound, i.e. speech traffic. In this context the speech is indented to mean the sound to be transmitted to and reproduced on the receiver side. The signalling part of the traffic is used for exchanging messages between the MTX (known also as Mobile Switching Center, MSC) and the mobile stations. The signalling handles e.g. the setting up and clearing calls, handover, updating, ordering change of transmitting power etc. The signalling transfers also various alarms and in addition, handles the remote control of the base station between the MTX and the MS. The signalling equipment consists in general of a modem (or modems) and coding equipment. In addition, the MTX functions for equalizing group delay distortion.

In analog mobile systems the analog part consists of the air or radio interface between the mobile station and the base station. So as to enable signalling traffic in the system, the binary position in the signalling is transferred as a frequency shifted signal in accordance with Fast Frequency Shift Keying (FFSK) method. As an example, with a data rate of 1200 bit/s, logical "one" is represented by one period of frequency of 1200 Hz, and logical "zero" by 1.5 period of frequency of 1800 Hz. The transition between a "one" and "zero" occurs at the zero transition points of the signal. All signalling is done with aid of frames, which are always of the same length and consist at the present systems of e.g. 166 bits. During reception, the first 15 bits may be used for bit synchronization. The transfer of the signal frames is done over the whole transmission channel.

In the present analog mobile communications systems the signalling and the voice transmission is transmitted on the same traffic channel. Therefore it is necessary to split the signal on the traffic channel before it arrives to the ear of the receiving party of the call. The splitting procedure can also be defined as muting of speech path during the signalling.

In one prior art solution the splitting is arranged by using an ETC board (Exchange Terminal Circuit board) of the MTX which is arranged to split the signal as response to a demand by the software of the exchange. However, due to a delay in the splitting caused by the software of the exchange a part of the signalling comes to the ear, and, instead of signalling, silence is transmitted to the PSTN (Public Switched Telephone Network). The delay caused by the ETC circuit is estimated to be up to 20 ms.

SUMMARY OF THE INVENTION

The disadvantage of the prior art arrangements is that due to the delay in the splitting of the signal stream on the traffic channel a part of the signalling comes to the ear of the user. Thus a part of the signalling becomes transferred to the earphone instead of the signalling system of the exchange. In addition, the speech is also cut in a unnatural manner, and is thus not very comfortable to listen by the telephone user at the receiver end.

It is an object of the present invention to overcome the disadvantages of the prior art solutions and to provide a new type of solution for splitting a signal stream including speech and signalling in systems including analog communications.

Another object of the present invention is to provide a method and arrangement by means of which a delay in detecting signalling from a signal stream is minimized.

Another object of the present invention is to provide a method and arrangement by means of which heavy cuts in the speech are eliminated and the quality of the reproduced sound is improved in systems including analog communications.

Another object of the present invention is to provide a method and arrangement by means of which comfort noise is generated to the speech to be heard on the receiving side during periods where the signal stream of a radio transmission is cut in a system including analog communications.

Another object of the present invention is to provide a method and arrangement in which a need for having one modem for every single channel from base stations is eliminated.

An further object of the present invention is to provide a method and an arrangement, by means of which a modem behind a group switch can be selectively switched to an incoming call from any base station switched to the exchange.

Other objects and advantages of the present invention will be brought out in the following part of the specification taken in conjunction with the accompanying drawings.

The objects are obtained by a method for splitting signalling and speech in a telephone system including analog mobile communications, wherein the signalling and the speech are transmitted on the same communications channel. The method comprises steps of arranging the signalling into frames included within the signal stream, evaluating acoustic noise during the transmission, monitoring the signal stream so as to detect frames including signalling bit sequences, splitting the signal stream into a signalling part and speech part during the transmission of the signal stream on basis of said monitoring, and generating comfort noise into the cut areas of the signal stream on basis of said evaluation so as to fill in those areas of the speech part which are cut off from the signal stream during the splitting.

According the invention, an arrangement in a telephone system including analog mobile communications, wherein signalling and speech are transmitted on the same communications channel, comprises at least one base station arranged to communicate with at least one mobile station via an analog radio interface and a mobile exchange of the mobile communications system arranged to communicate with said at least one base station. According to the invention, the arrangement further comprises modem means adapted for monitoring the signal stream from the transmitting mobile station so as to detect signalling frames in the signal stream containing signalling information and for splitting the speech and signalling in the analog mobile network during the transmission of the signal stream as response to said monitoring, means for evaluating acoustic noise during the transmission, and means for generating comfort noise into the cut areas of the signal stream on basis of the evaluation of the acoustic noise so as to replace those areas of the speech signal which are possibly cut off during the splitting.

A telephone exchange of a mobile telecommunication system according to the present invention comprises means for communicating with a mobile station via a base station, wherein the communications between the mobile station and the base station is accomplished via an analog radio interface. According to the invention the exchange further comprises modem means adapted for monitoring the signal stream from the transmitting mobile station so as to detect frames in the signal stream containing signalling information and for splitting the speech and signalling during the transmission of the signal stream as response to said monitoring, and means for generating comfort noise into the cut areas of the signal stream on basis of an evaluation of an acoustic noise evaluated during the transmission, so as to replace those areas of the speech signal which are possibly cut off during the splitting.

Several advantages are obtained by means of the present invention, since the solution provides a simple manner for the splitting of the signal such that the delay in the splitting is minimized and hence the quality of the reproduced sound is improved. A minimum amount of signalling is lost, i.e. routed to a wrong destination, and in practice no signalling enters to the earpiece of the receiver. The lost parts of speech are replaced by comfort noise, and thus the user does not notice any remarkable cuts in the speech. In addition, the number of modems in the exchange can be reduced by means of the invention.

In the following the present invention and the other objects and advantages thereof will be described by way of an example with reference to the annexed drawings, in which similar reference characters throughout the various figures refer to similar features. It should be understood that the following exemplifying description of the invention is not meant to restrict the invention to the specific forms presented in this connection but rather the present invention is meant to cover all modifications, similarities and alternatives which are included in the spirit and scope of the present invention, as defined by the appended claims.

DETAILED DESCRIPTION OF THE DRAWINGS

Figure 1:
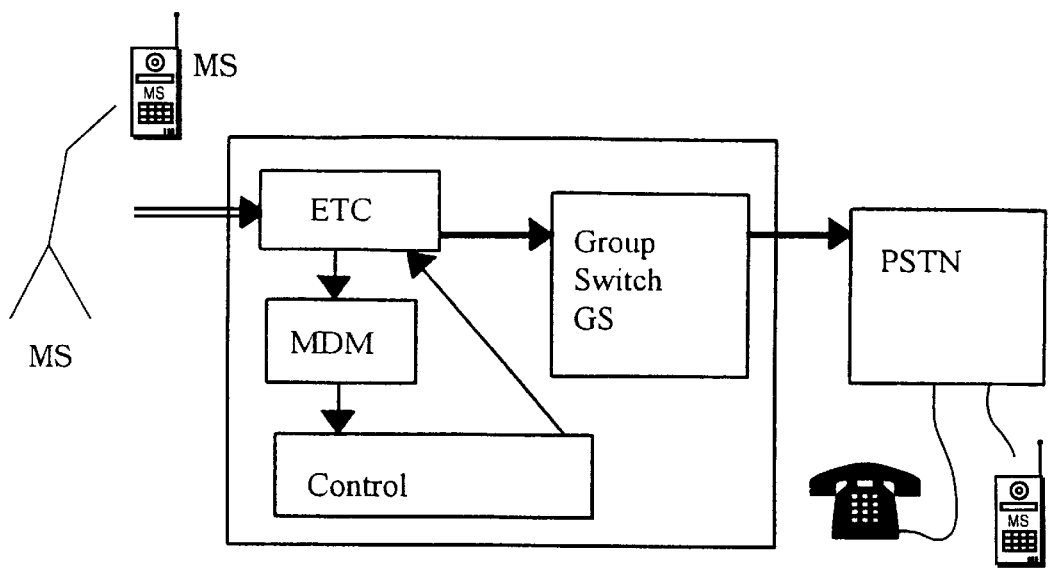
FIG. 1 is a schematic presentation of one prior art arrangement.

FIG. 1 is a schematic presentation of the prior art arrangement, in which the splitting is controlled by the software (the ETC board; Exchange Terminal Circuit) of the exchange MTX of an analog mobile telephone system. The MTX is arranged between a base station BS and a public switched telephone network PSTN. As can be seen, the receivers beyond the PSTN may be fixed line telephones and/or mobile telephones of any appropriate system. As was described above, the splitting of the signal stream from the BS is controlled by the ETC board before the speech signal together with silence is passed to the group switch GS, and therefrom further via the PSTN to the receiving party. The signalling goes to a modem MDM (Modulator-Demodulator) and further to controller means of the MTX, which in turn controls the operation of the ETC board. This kind of circuit arrangement causes a delay which, in turn, causes that a part of the signalling enters the PSTN and comes to the receiver end, which is not comfortable to listen, and also that the speech is cut in a undesirable manner, which causes a further decrease in the quality of the received sound.

Figure 2:
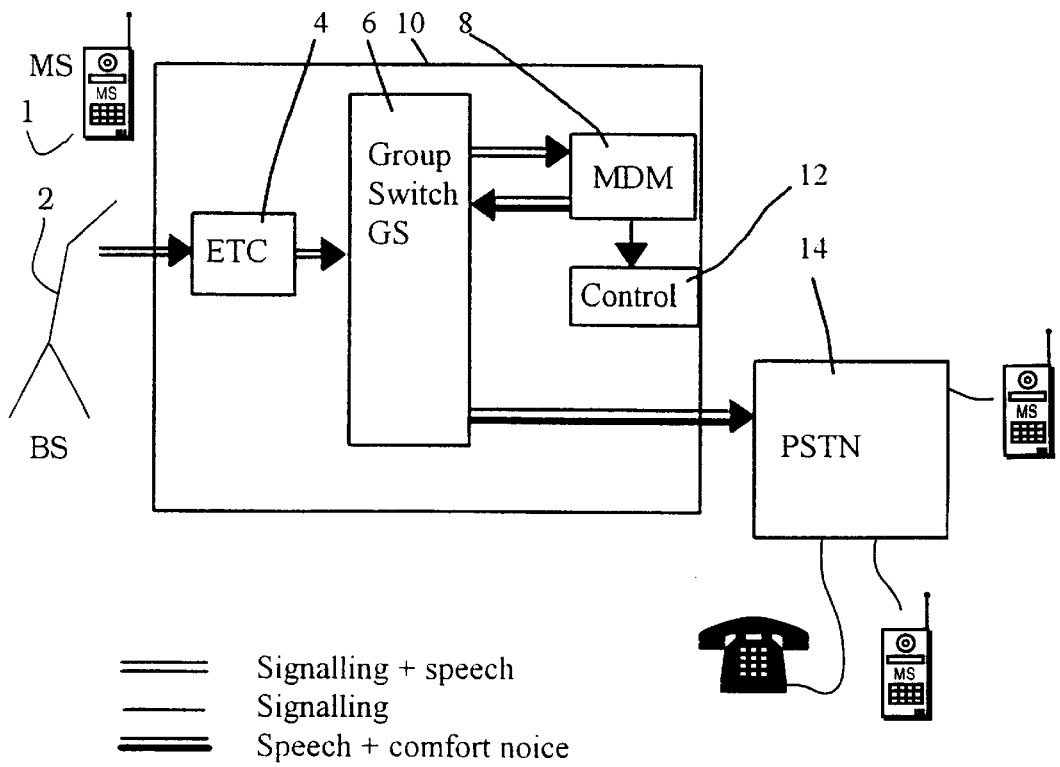
FIG. 2 is a schematic presentation of an arrangement according to one embodiment of the present invention.

FIG. 2 discloses a schematic presentation of one arrangement according to the present invention. A signal stream coming from a mobile station MS 1 via a base station BS 2 is received by an ETC board 4 of an analog mobile system exchange MTX 10. It is not split in the ETC board, but is instead passed as unsplit to a group switch GS 6, and further to a modem MDM 8 of the MTX. According to the principles of the present invention, the MDM 8 is arranged behind the GS 6, i.e. such that the incoming signal stream passes first through the GS 6 before it enters the MDM 8.

The MDM is arranged to split the signal and to transmit the signalling part of the signal stream (the signalling frames) further to control means 12 of the MTX 10 and the part of the signal stream including speech back to the GS. The implementation of the splitting function solely within the MDM minimizes the delay in detecting the point of beginning of the speech in the signal stream, and the delay may be as low as almost 0 seconds in the inventive arrangement. In the prior art systems some signalling was always transmitted to the GS due to the delay in the control circuitry of the MEX. Instead of this, in the inventive arrangement the MDM splits the signal stream without any additional control signals from the MTX controller prior the GS transmits it further to the PSTN. No changes are required to the functions of the per se known modem, but the interfaces thereof are arranged in a new manner so as to enable the required connections.

Figure 3:
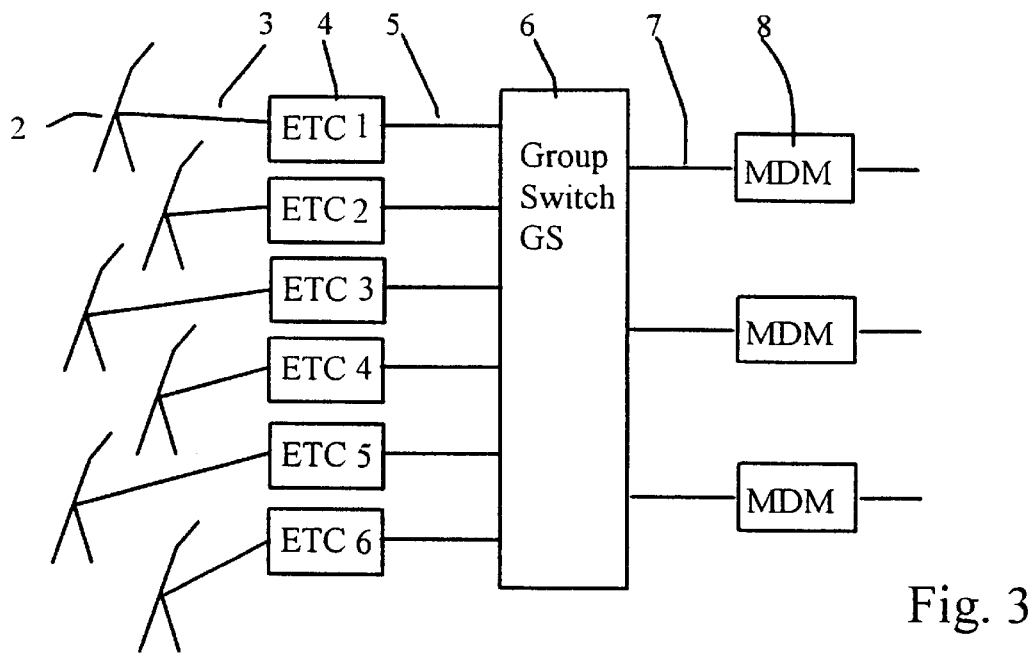
FIG. 3 illustrates one possible connection of modems in accordance with the invention.

Referring now to FIG. 3, which discloses three MDMs 8 arranged behind the GS 6 of the exchange. There is no need to have a separate MDM for each of the six channels (through connections 3, 5) from the six base stations 2 (and thus ETCs 4 thereon), but one MDM behind the GS may be selectively switched to such channels on which there are ongoing calls. This is enabled by the fact that there are always channels which are not carrying calls simultaneously, and thus in the prior art solutions comprising one modem for each of the ETCs there are always MDMs which are not in use. By using MDMs which can be selectively switched to the desired channel the use thereof can be optimized.

Figure 4A:
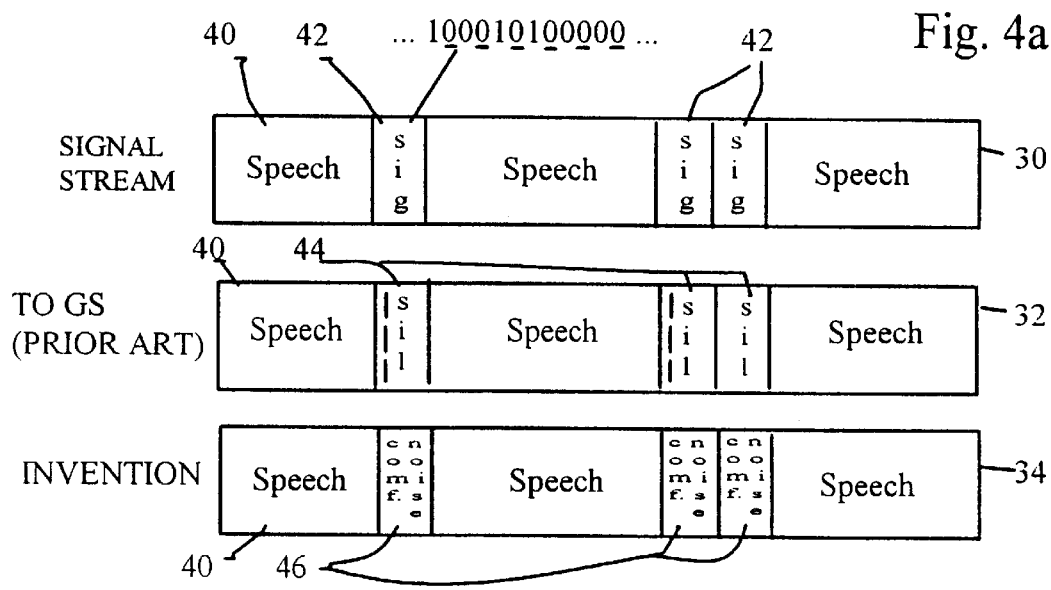
FIG. 4a discloses schematically a signal stream to be detected and evaluated, a prior art signal stream after the splitting, and a signal stream split in accordance with the invention, and FIG. 4b discloses the contents of one signalling frame before the splitting and after the prior art splitting.
Figure 4B:
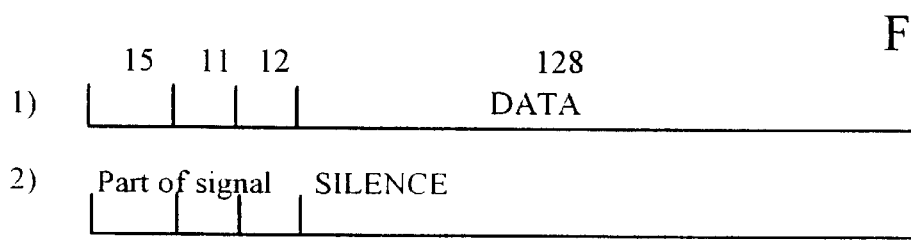

The splitting in the MDM will now be discussed with reference to FIGS. 4a and 4b. As the speech and the signalling are transmitted on the same physical transfer path, the signal stream 30 coming from the BS 2 consist of portions containing the actual speech and signalling frames 42. During the signalling, i.e. the signalling frames 42, the speech path is closed, which in the prior art is notified by the users as a short period of muting during the signalling (silence portions 44 in prior art stream 32). The signalling frames 42 include bits having a predefined bit sequences in a per se known manner, as is indicated by an exemplifying sequence and by FIG. 4b(1). The underlined zeroes of the shown sequence are so called splitting zeroes of the signalling frame used to manage and control the splitting operations in accordance with the present invention. As can be seen from FIG. 4b(1), the 166 bit frame includes 15 bits for bit synchronization, 11 bits for frame synchronization and 12 bits for said splitting zeroes, the remaining part (128 bits) being reserved for the transferred data. The arrangement for transmitting bits may be a frequency shifted signal in accordance with the Fast Frequency Shift Keying (FFSK) method, as was described above.

The described system uses a binary signalling method, in which one block or frame has a length of 166 bits. An error correcting code may be used in the signalling (so called Hagelbarger code), which protects the frames from errors consisting at most 6 bits, in case the distance between the errors is at least 9 bits. As mentioned, the used data modulation is the FSK in which 1200 Hz corresponds logical one and 1800 Hz corresponds to logical zero. The transfer speed may be e.g. 1200 bit/s. Each of the signalling frames 42 includes one command, acknowledgement, call, control data etc. Several signalling frames following each other form signalling sequences which are capable of accomplishing more complex and wider control functions, such as establishing a call.

As is indicated by a dashed line within the frames 44 of the prior art stream 32, a part of the signalling is not cut off from the frame 44, which should include only silence, due to the delays of the prior art splitting solutions, as was described above. This is also shown in the schematic signal frame of FIG. 4b(2) corresponding the situation of the prior art frame 44, where a part of the signalling still exists before the indented silence starts.

Figure 5:
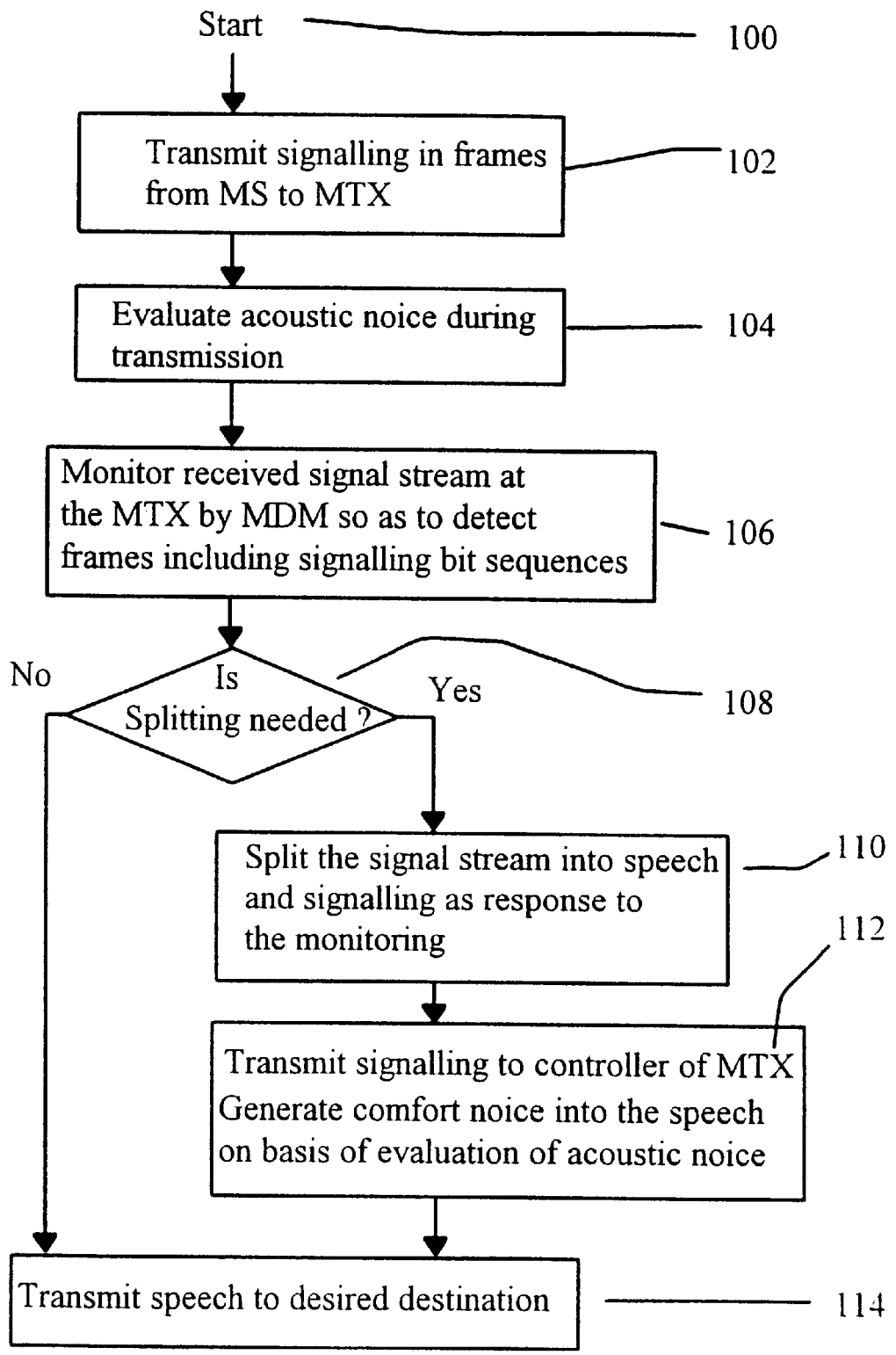
FIG. 5 discloses a flow chart for one embodiment of the present invention.

Referring now also to the flow chart of FIG. 5, at step 102 the signalling frames 42 are transmitted within the transmission of the signal stream 30 from the MS to the MTX. The MTX is arranged to evaluate the background acoustic noise (step 104) during the transmission, so as to be able to generate comfort noise to the signal stream at a later stage (step 112) after the splitting in the MDM, as will be explained more detailed later on.

The signal stream 30 is continuously monitored by the MDM as the signal stream arrives the MDM, step 106. More precisely, the subsequent frames of the signal stream are monitored so as to detect those certain sequences in the frames 42 indicating signalling. In case no signalling is detected at step 108, there is no need for splitting operations, and the speech is transmitted further to the final destination. In case a signalling frame is detected at step 108, and the signalling needs to be split off from the signal stream, the MDM immediately starts the splitting operation (step 110) with a minimum delay as a response to the monitoring. At step 112 the signalling part 42 will be transmitted to the controller of the MTX. Comfort noise is generated to the speech, and more precisely to those "empty" portions 44 containing silence of the prior art signal stream 32, on basis of said evaluation at step 104. In other words, the MDM is adapted to generate comfort noise to the speech signal for those periods of the signal stream from which some of the speech has been cut off during the splitting.

The comfort noise is preferably arranged to correspond the acoustic noise on the transmit side (i.e. the speech on the MS side). The MTX evaluates the characteristic parameters of the noise by continuously monitoring the speech flow so that it is possible to generate the comfort noise by means of the MDM on basis of the speech characteristics in the speech portion 40 slightly before the signalling frame 42. Thus the stream 34 outputted from the MDM includes speech portions 40 and blocks 46 including comfort noise corresponding the speech before the signalling frames, said blocks 46 replacing the prior art "silent" blocks 44. This stream 34 is then transmitted at step 114 to the final destination, such as to an earpiece of a receiving telephone. The comfort noise 46 corresponds substantially the actual (original) speech, and the listener should not realize any difference in the actual reproduced speech and those parts including comfort noise.

The MTX may comprise voice activity detector for the above described evaluating purposes. These are arranged to evaluate the acoustic noise in the speech in order to be able to create characteristic parameters of the speech. The comfort noise is then generated in the MTX on basis of said evaluation by the voice activity detector. One example of the voice activity detector is defined more precisely in GSM recommendation GSM 06.32 "Voice Activity detection", which is incorporated herein by reference.

As the MDM both detects and splits the signal stream, there is no delay which would otherwise be caused by connections to some additional controlling equipment or circuitry. The speech signal and the signalling bit sequences are separated as accurately as possible with a minimum delay.

Thus, the invention provides an arrangement, an apparatus and a method by which a significant improvement can be achieved in the area of communications system including analog transmissions. It should be noted that the foregoing examples of the embodiments of the invention are not intended to restrict the scope of the invention defined in the appended claims. All additional embodiments, modifications and applications obvious to those skilled in the art are thus included within the spirit and scope of the invention as set forth by the claims appended hereto.

What is claimed is:

1. A method for splitting signalling and speech in a telephone system including analog mobile communications, wherein the signalling and the speech are transmitted on the same communications channel, comprising:

arranging the signalling into frames included within a signal stream, evaluating acoustic noise during the transmission, monitoring the signal stream so as to detect frames including signalling bit sequences, splitting the signal stream into a signalling part and a speech part during the transmission of the signal stream on basis of said monitoring, and generating comfort noise into the cut areas of the signal stream on basis of said evaluating so as to fill in those areas of the speech part which are cut off from the signal stream during the splitting.

2. A method according to claim 1, wherein the signal is transmitted from a mobile station to a telephone exchange of the system providing mobile communications, and that the signal stream is monitored by a modem of the telephone exchange.

3. A method according to claim 1, wherein the splitting is implemented by means of a modem of a telephone exchange of the system providing mobile communications.

4. A method according to claim 1, wherein the splitting is accomplished only after the combined speech and signalling stream has passed through a group switch of a telephone exchange of the telephone system providing mobile communications.

5. A method according to claim 1, wherein the step for monitoring the frames in the signal stream includes detecting frames of signalling which is transferred as a frequency shifted signal in accordance with Fast Frequency Shift Keying (FFSK) method, and separating the detected signalling frames from the speech signal in a modem.

6. A method according to claim 1, wherein the step for evaluating comprises detecting speech by a voice activity detector, evaluation of the acoustic noise in the speech in order to create characteristic parameters of the speech, and generation of such a comfort noise in an exchange of the mobile communications system which corresponds said acoustic noise.

7. A method according to claim 1, wherein the analog system comprises a Nordic Mobile Telephone (NMT) system.

8. An arrangement in a telephone system including analog mobile communications, wherein signalling and speech are transmitted on the same communications channel, comprising:

at least one base station arranged to communicate with at least one mobile station via an analog air interface, an exchange of the mobile communications system, said exchange being arranged to communicate with said at least one base station, the arrangement further comprising:

modem means adapted for monitoring the signal stream from the transmitting mobile station so as to detect signalling frames in the signal stream containing signalling information and for splitting the speech and signalling in the analog mobile network during the transmission of the signal stream as response to said monitoring, means for evaluating acoustic noise during the transmission, and means for generating comfort noise into the cut areas of the signal stream on basis of the evaluation of acoustic noise so as to replace those areas of the speech signal which are possibly cut off during the splitting.

9. An arrangement according to claim 8, wherein the frames in the signal stream are transferred as a frequency shifted signal in accordance with Fast Frequency Shift Keying (FFSK) method.

10. An arrangement according to claim 8, wherein the means for evaluating are comprising:

a voice activity detector for detecting speech, means for the evaluation of the acoustic noise in order to receive the characteristic parameters of the speech, and generator means implemented in said modem means for generation of a comfort noise corresponding said acoustic noise.

11. An arrangement according to claim 8, wherein the exchange includes a plurality of modems and a group switch arranged between a plurality of channels from several base stations, the arrangement being such that each of the modems of said plurality of modems can be selectively switched to any of the channels of said plurality of channels.

12. An arrangement according to claim 8, wherein the analog system comprises a Nordic Mobile Telephone (NMT) system.

13. A telephone exchange of a mobile telecommunication system, comprising:

means for communicating with a mobile station via a base station, wherein the communications between the mobile station and the base station is accomplished via an analog radio interface, modem means adapted for monitoring the signal stream from the transmitting mobile station so as to detect frames in the signal stream containing signalling information and for splitting the speech and signalling during the transmission of the signal stream as response to said monitoring, and means for generating comfort noise into the cut areas of the signal stream on basis of an evaluation of an acoustic noise evaluated during the transmission, so as to replace those areas of the speech signal which are possibly cut off during the splitting.

14. A telephone exchange in accordance with claim 13, further including means for evaluating said acoustic noise.

15. A telephone exchange in accordance with claim 13, comprising a plurality of modems and a group switch arranged between a plurality of channels from several base stations, the arrangement being such that each of the modems of said plurality of modems can be selectively switched to any of the channels of said plurality of channels.

* * * * *